United States Patent
Press (10) Patent No.: US 9,121,390 B2
(45) Date of Patent: Sep. 1, 2015

(54) TOWER FOR A WIND POWER PLANT AND METHOD FOR ERECTING A TOWER FOR A WIND POWER PLANT

(75) Inventor: Gregor Prass, Hamburg (DE)

(73) Assignee: Timber Tower GmbH, Hannover (DE)

( * ) Notice: Subject to any disclaimer, the term of this patent is extended or adjusted under 35 U.S.C. 154(b) by 0 days.

(21) Appl. No.: 13/696,874

(22) PCT Filed: Apr. 26, 2011

(86) PCT No.: PCT/EP2011/002076
§ 371 (c)(1),
(2), (4) Date: Jan. 17, 2013

(87) PCT Pub. No.: WO2011/141124
PCT Pub. Date: Nov. 17, 2011

(65) Prior Publication Data
US 2013/0108465 A1     May 2, 2013

(30) Foreign Application Priority Data

May 12, 2010   (DE) .......................... 10 2010 020 443

(51) Int. Cl.
*F03D 11/04*   (2006.01)
*E04H 12/34*   (2006.01)
(Continued)

(52) U.S. Cl.
CPC ................ *F03D 11/04* (2013.01); *E04H 12/02* (2013.01); *E04H 12/04* (2013.01); *E04H 12/06* (2013.01);
(Continued)

(58) Field of Classification Search
CPC ................. F03D 11/04; F05C 2223/00; F05B 2280/4002; F05B 2240/912; E04H 12/342; E04H 12/06; E04H 12/04; E04H 12/02; Y02E 10/728

USPC ........ 52/651.01, 633, 636–637, 648.1, 653.1, 52/649.3, 649.4, 651.02, 651.11, 653.2
See application file for complete search history.

(56) References Cited

U.S. PATENT DOCUMENTS 1,916,724 A * 7/1933 Fluor ............................ 261/113
1,953,372 A * 4/1934 Stillger et al. ................ 261/113
(Continued)

FOREIGN PATENT DOCUMENTS

DE   102007006652 A1 * 8/2008
JP         05311680 A * 11/1993
(Continued)

*Primary Examiner* — Jeanette E Chapman
(74) *Attorney, Agent, or Firm* — Mark Rodgers (57) ABSTRACT

The invention relates to a tower for a wind energy plant having walls which are produced at least partially from individual wall sections made from a wooden material, the wall sections being connected to one another via connecting means, and to a method for erecting a tower of this type. It is therefore an object of the invention to provide a tower for a wind power plant, which tower makes a greater rotor blade length possible with an unchanged height of the tower of the wind power plant and with an unchanged projection of the rotor beyond the tower outer side as viewed from the tower center axis. The object according to the invention is achieved by virtue of the fact that an falsework is provided at least partially in the tower interior, by way of which falsework the wall sections are connected in a retentive manner, and the wall sections are arranged on the falsework in such a way that a surface line which is produced in the case of a vertical section through the tower wall which is formed from wall sections has a gradient which becomes greater as the tower height increases.

15 Claims, 5 Drawing Sheets

(51) Int. Cl.
*E04H 12/02* (2006.01)
*E04H 12/04* (2006.01)
*E04H 12/06* (2006.01)

(52) U.S. Cl.
CPC ......... *E04H 12/342* (2013.01); *F05B 2240/912* (2013.01); *F05B 2280/4002* (2013.01); *F05C 2223/00* (2013.01); *Y02E 10/728* (2013.01)

(56) References Cited

U.S. PATENT DOCUMENTS

| | | | | |
|---|---|---|---|---|
| 2,358,704 | A * | 9/1944 | Goudy | 52/236.1 |
| 2,834,073 | A * | 5/1958 | Hoyle, Jr. | 52/848 |
| 3,485,005 | A * | 12/1969 | Kutchai | 52/651.01 |
| 3,603,051 | A * | 9/1971 | Lussky | 52/245 |
| 3,800,970 | A * | 4/1974 | Jackson | 220/560.08 |
| 3,812,771 | A * | 5/1974 | Yokoyama et al. | 454/1 |
| 3,870,773 | A * | 3/1975 | Luzaich | 261/111 |
| 4,663,897 | A * | 5/1987 | Ridett | 52/73 |
| 5,237,783 | A * | 8/1993 | DiRico et al. | 52/73 |
| 5,785,419 | A * | 7/1998 | McKelvey | 366/6 |
| 6,076,320 | A * | 6/2000 | Butler | 52/294 |
| 7,877,934 | B2 * | 2/2011 | Livingston et al. | 52/40 |
| 8,069,634 | B2 * | 12/2011 | Livingston et al. | 52/745.17 |
| 8,322,107 | B2 * | 12/2012 | Murata | 52/652.1 |
| 8,555,600 | B2 * | 10/2013 | Cortina-Cordero et al. | 52/745.18 |
| 2005/0166521 | A1 * | 8/2005 | Silber | 52/633 |
| 2007/0294955 | A1 * | 12/2007 | Sportel | 52/40 |
| 2008/0134589 | A1 * | 6/2008 | Abrams et al. | 52/79.1 |
| 2008/0276555 | A1 * | 11/2008 | Larson et al. | 52/293.1 |
| 2010/0082604 | A1 * | 4/2010 | Gutt et al. | 707/721 |
| 2010/0139181 | A1 * | 6/2010 | Cortina-Cordero et al. | 52/125.2 |
| 2012/0017536 | A1 * | 1/2012 | Hager | 52/651.01 |
| 2012/0137620 | A1 * | 6/2012 | Gevers et al. | 52/651.01 |

FOREIGN PATENT DOCUMENTS

| | | |
|---|---|---|
| JP | 2002030615 A * | 1/2002 |
| WO | WO 2008095667 A2 * | 8/2008 |

* cited by examiner

TOWER FOR A WIND POWER PLANT AND METHOD FOR ERECTING A TOWER FOR A WIND POWER PLANT

The invention relates to a tower for a wind power plant having walls which are produced at least partially from individual wall sections made from a wooden material, the wall sections being connected to one another via connecting means, and to a method for erecting a tower of this type.

A wind power plant is an apparatus for generating electric energy. The wind power plant is provided with a foundation, a tower which is erected on the foundation, and a nacelle which is arranged on the tower. The drive unit which is connected to rotor blades for energy generation is situated on the nacelle.

The construction of the tower is developed with respect to the static load which is produced on the tower by the nacelle and with respect to the dynamic loads which are produced by the rotation of the rotational blades of the rotor and the capability of the nacelle to move in a manner which is dependent on the wind direction. Known towers are produced from steel rings or concrete elements. Here, the footprints of the known towers are either polygons or annular circular segments. Polygonal towers which are produced from individual segments made from concrete are known from WO 2003/069099 A. Furthermore, it is known to erect polygonal towers of this type made from wood (DE 10 2007 006 652 A1).

From economic aspects, it is desirable to erect the height of the towers in an economically maximized manner, since the output of a wind power plant depends on the hub height of the rotor and the output rises as the height increases. At the same time, the tower rise which are produced by the greater height of the tower. The wall thicknesses increase and, as a result, the erection outlay of the tower rises.

A decisive aspect of towers which are formed from segments which are arranged in sections is that the horizontal contact faces of the segments which are arranged above one another are sensitive to shear loads or transverse forces. This has to be taken into consideration in the statics of the towers, in order that said predetermined breaking point is mitigated, which leads to increased material use and, in particular, necessitates the use of complicated connecting means.

It has been shown that towers for wind power plants can be produced from wood, by way of which towers can be erected inexpensively, rapidly and in a manner which saves material. It has proven particularly favorable here to produce said towers on site from individual constituent parts which are connected in each case directly to the adjacent elements via connecting means. However, the erection method has been shown to be in need of improvement, in such a way that the individual constituent parts can be connected to one another rapidly and with high precision, without great assembly tolerances occurring.

A further aspect of the construction of high wind power plants is what is known as the clearance, which is the spacing of the rotor tip from the tower. Here, the rotor size is determined by the projection of the rotor beyond the tower outer side, as viewed from the tower center axis, and by the height of the tower of the wind power plant.

It is therefore an object of the invention to provide a tower for a wind power plant, which tower makes a greater rotor blade length possible with an unchanged height of the tower of the wind power plant and with an unchanged projection of the rotor beyond the tower outer side as viewed from the tower center axis. Furthermore, it is the object of the invention to provide a method for erecting a tower of this type.

The object according to the invention is achieved with regard to the tower by virtue of the fact that an falsework is provided at least partially in the tower interior, by way of which falsework the wall sections are connected in a retentive manner, and the wall sections are arranged on the falsework in such a way that a surface line which is produced in the case of a vertical section through the tower wall which is formed from wall sections has a gradient which becomes greater as the tower height increases.

As a result, it becomes possible to increase the clearance with an unchanged tower height, the stability of the tower being at least maintained at the same time. Furthermore, the individual wall sections can be placed onto one another and assembled reliably. In a simple way, the assembly accuracy is thus increased. At the same time, furthermore, the entire static loading can be absorbed by the wall elements. As a result of the provision of an increasing gradient as a function of the tower height, it becomes possible to increase the rotor length with an unchanged tower height and a sufficient tower base.

A further teaching of the invention provides that, in the case of a tower with a polygonal base area, the section runs centrally through a wall section. It is advantageous here if the surface line is at least partially a parabola, a polynomial, an exponential function, a circular arc and/or a clothoid. In this way, a solid base can be produced for the tower with as great a clearance as possible for the rotor. As an alternative, the surface line rises linearly in sections.

A further teaching of the invention provides that the falsework is composed of wood and/or is a timber frame construction. A Falsework is a construction aid per the definition from Merriam Webster; "false work" as "temporary construction work on which a main work is wholly or partly built and supported until the main work is strong enough to support itself". Accordingly, the construction of the walls to the falsework takes place successively as the assembly progresses. The wood used can be processed inexpensively and very satisfactorily. The falsework is preferably assembled from individual sections. It is advantageous here if the individual sections are produced on site, since the transport outlay is therefore reduced, thus the preferable use of wood. Furthermore, it is advantageous that the Falsework timber frame construction has at least 4 stands which are connected by way of struts, bars, head blocks and sole blocks. A further teaching of the invention provides that the Falsework platforms are formed from at least two sections. This assists the assembly in a simple way, the falsework itself does not assume any statically relevant function in the tower itself, but only supports a small number of wall sections at a time for the purpose of assembling the wall sections together, the wall sections being self-supporting after assembly, with the result that the falsework can be dismantled with no weakening of the tower. Thus the Falsework of this application is used and configured exactly as the known definition of the term "Falsework".

A further teaching of the invention provides that, after being attached to the falsework, the wall section has a curvature in the direction of the surface line. This provides a surface line according to the invention in a simple way.

A further teaching of the invention provides that the platform of a section of the falsework which is placed onto a section of the falsework which lies beneath it and has already been erected is of equivalently smaller configuration in the direction of the center axis of the tower. In addition, it is advantageous if at least one section of the falsework has a mounting region for attaching wall sections, which mounting region is arranged between the foot of the section and the platform of the section. A curved surface can be produced simply in this way.

A further teaching of the invention provides that the wall sections are arranged offset with respect to one another so as to form a helix. As a result of this arrangement with respect to one another, the shear loading/transverse force is dissipated via the helix and there is no hard point for lifting off the tower at a predefined point. For this reason, wall thicknesses can be reduced and it is possible, in particular, to select simpler and therefore less expensive connecting means. As a result, a surface line according to the invention can be provided in a simple way at the same time.

A further teaching of the invention provides that the helix is a single helix or a multiple helix which is formed from a plurality of single helices. In the case of a multiple helix, it is advantageous that the number of single helices which form the multiple helix coincides with the number of wall sections in a horizontal plane of the tower. In the case of the multiple helix, the wall sections are preferably provided as a diamond which stands on its tip. Here, the diamond is provided as a circular segment or is formed by two triangles which are connected vertically to one another, the faces of the triangles being arranged at an angle with respect to one another, which angle is 360° divided by the number of single helices. Furthermore, it is advantageous that the upper abutment sides of the individual constituent parts of a helix have a continuous line and/or a step. As a result, the dissipation of loadings in the tower is improved.

A further teaching of the invention provides that the wall sections have slots at least partially in the joints, which slots are arranged transversely with respect to the joint direction and/or longitudinally with respect to the joint direction. Connecting means are preferably inserted into the slots, which connecting means are preferably metal plates, particularly preferably perforated plates which are preferably adhesively bonded. In addition, the joint openings can be masked by way of, for example, a tape or Plexiglas. The introduction of the adhesive preferably takes place by spraying of the spaces between component and connecting element. As an alternative, wooden parts or wooden dowels can be used if the constituent parts are wooden elements. Said connecting means are inexpensive elements which, however, provide the necessary strengths with regard to shear or shear loadings between the individual constituent parts.

In addition to the operating loadings which act on the tower, climatic loadings also act on the tower. In the case of steel towers, said climatic loading is counteracted by the application of a coating to the tower. If reinforced concrete is used, the steel framework absorbs the tensile loadings of the tower. The concrete coating absorbs the compressive loadings and serves at the same time to protect the steel construction against the environmental influences in the form of moisture and chemical reactions as a result of the surrounding atmosphere. The thickness of the concrete has to ensure that the steel framework is protected against said loadings. In the case of wooden constructions, corresponding weather loadings are counteracted by coatings. At the same time, only wooden materials which are authorized for exterior use can be used for the construction of wooden towers.

A further teaching of the invention therefore provides that a coating is applied at least partially to the outer surface of the tower, the coating preferably being applied in such a way that the coating absorbs tensile loadings which act on the outer surface of the tower, and that the coating seals the outer surface against environmental influences, in particular moisture, which act on the surface of the tower from the outside.

In relation to wooden towers, the coating makes it possible to use wooden materials and their connecting means which possess merely an authorization for interior fitting.

A further teaching of the invention provides that the coating is applied over the full area in the coated section of the tower, and encapsulates the coated section. It is advantageous here that the coating is a layer material, a film, a woven fabric, a textile or a panel. It is particularly preferably a film, a panel, a woven fabric and/or a textile made from plastic, polypropylene, polyurethane, polyvinyl chloride, polyester, polycarbonate or polyethylene particularly preferably being used as materials. Materials of this type are capable of absorbing tensile stresses and at the same time of providing a closure and therefore a seal with respect to environmental influences which act on the surface of the tower. At the same time, materials of this type have lower weights per unit area than, for example, coats on the surface of the tower, with the result that this weight can be reduced in the construction with regard to the static compressive loading, as a result of which the tower construction can also be configured to be slimmer overall. At the same time, the costs of said materials are lower, for example, in comparison with coats.

A further teaching of the invention provides that the coating is applied at different times during the tower erection. As a first variant, the coating is applied after erection of the tower. This can take place from above or below. As an alternative, the coating can be applied in sections during the erection of the tower or can already be applied to the individual constituent parts before erection of the tower. If the coating is applied before erection of the tower, it has proved advantageous to apply the coating on site in the construction area. As a result, the costs of the coating are reduced and it can be ensured at the same time that the coating is not damaged during the transport of the individual elements. The individual sections of the coating are subsequently connected to one another, the connection particularly preferably taking place via adhesive bonding or welding of the joints.

A further teaching of the invention provides that the coating is applied directly to the constituent parts of the tower. The application preferably takes place over the full area by adhesive bonding. As an alternative, adhesive bonding can take place in sections on a surface of a constituent part. The adhesive bonding ensures that the coating absorbs the static loading.

A further teaching of the invention provides that the tower is erected at least partially from steel, concrete, in particular reinforced concrete, and/or wood or wooden material. The wood or wooden material is preferably cross-laminated timber and/or wooden composite materials.

A further teaching of the invention provides that, in the case of wood, the coating has a lower vapor permeability than the wood. In this way, the diffusion is reversed, that is to say the vapor permeability of the tower does not become greater toward the outside, but rather toward the inside. Furthermore, a heat generator is preferably arranged in the interior of the tower, said heat generator preferably being the electronic power system of a wind power plant. Here, the heat is the output power loss of the electronic power system. As a result of the heat generation, the moisture which is situated in the interior of the tower is discharged upward and the moisture which emanates from the wood is moved toward the interior of the tower and is likewise also discharged. If the coating is damaged, it is ensured that the moisture is transported away to the inside. As a result of the particles and minerals which are situated in the moisture, the damage to the coating is closed gradually and it is ensured at the same time, furthermore, that the moisture escapes toward the inside.

A further teaching of the invention provides that the supporting structure of the tower is erected at least partially from materials which are not suitable for exterior use. These are materials which have obtained authorization merely for interior use in the construction of buildings. As a result of the application of the coating, it becomes possible to use materials of this type and also connecting means for the supporting construction of a tower for a wind power plant, because the coating ensures the state of the interior use of the materials.

A further teaching of the invention provides that the tower is assembled from individual constituent parts on site. The constituent parts which are assembled on site are flat elements. Assembly of this type of the tower from individual flat elements ensures that the transport outlay for the individual towers is reduced considerably.

The object according to the invention is achieved with regard to the method by virtue of the fact that the following steps are provided: mounting of a first section of an falsework on a foundation; provision of the first wall sections; mounting of the first wall sections on the foundation; fastening of the first wall sections to the first section of the falsework; application of the next section of the falsework to the upper side of the preceding falsework section; attaching of the next wall sections to the sections which lie beneath them and production of a retentive connection to the wall sections which are already mounted and to the falsework; repetition of the steps until the topmost section of the falsework is mounted and the finishing wall sections are fastened, the wall sections being arranged in such a way that a surface line is produced, the gradient of which increases with the tower height. Furthermore, a tower having the abovementioned features is erected by way of the method.

In the following text, the invention will be explained in greater detail using preferred exemplary embodiments in conjunction with a drawing, in which.

Figure 1:
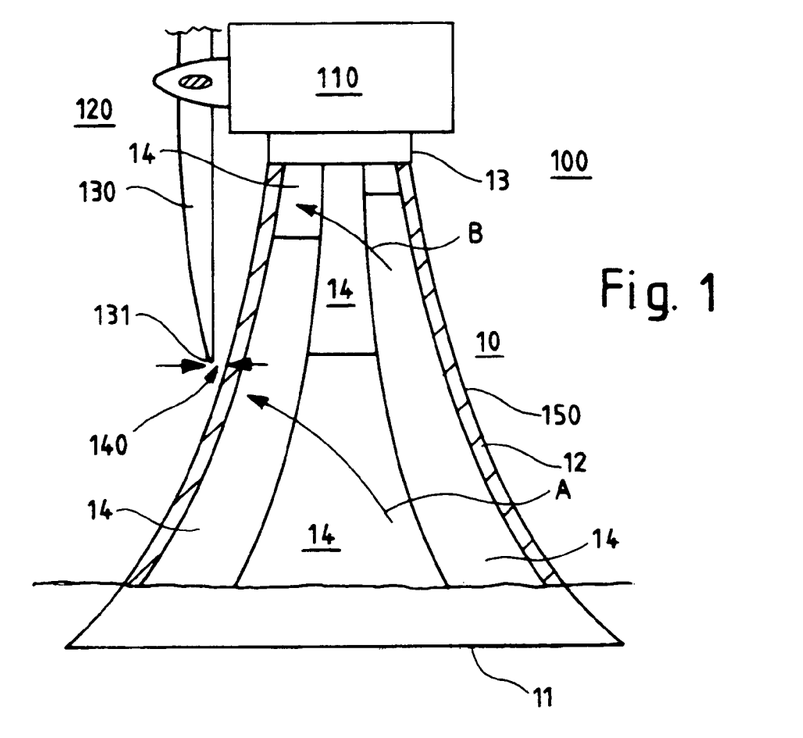
FIG. 1 shows a three-dimensional view of a wind power plant with a first embodiment of the tower according to the invention.
Figure 2:
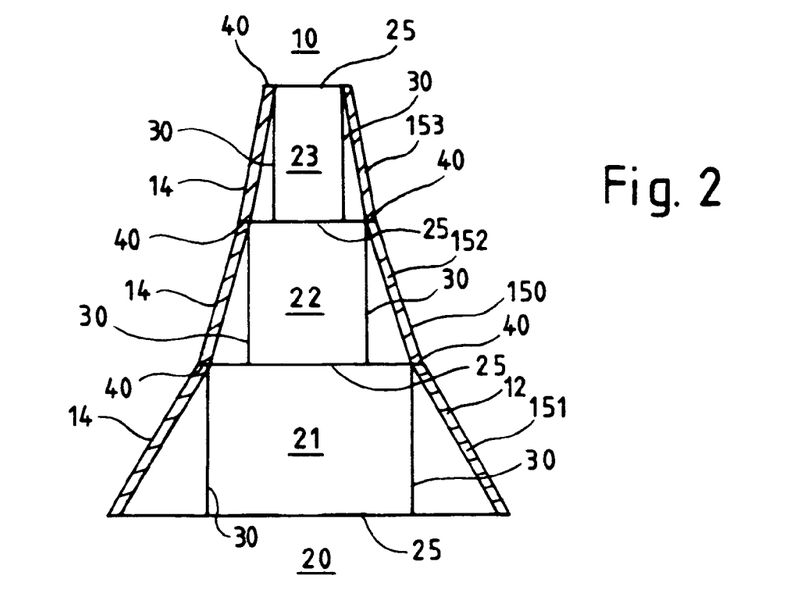
FIG. 2 shows a three-dimensional sectional view of a second embodiment of the tower according to the invention.
Figure 3:
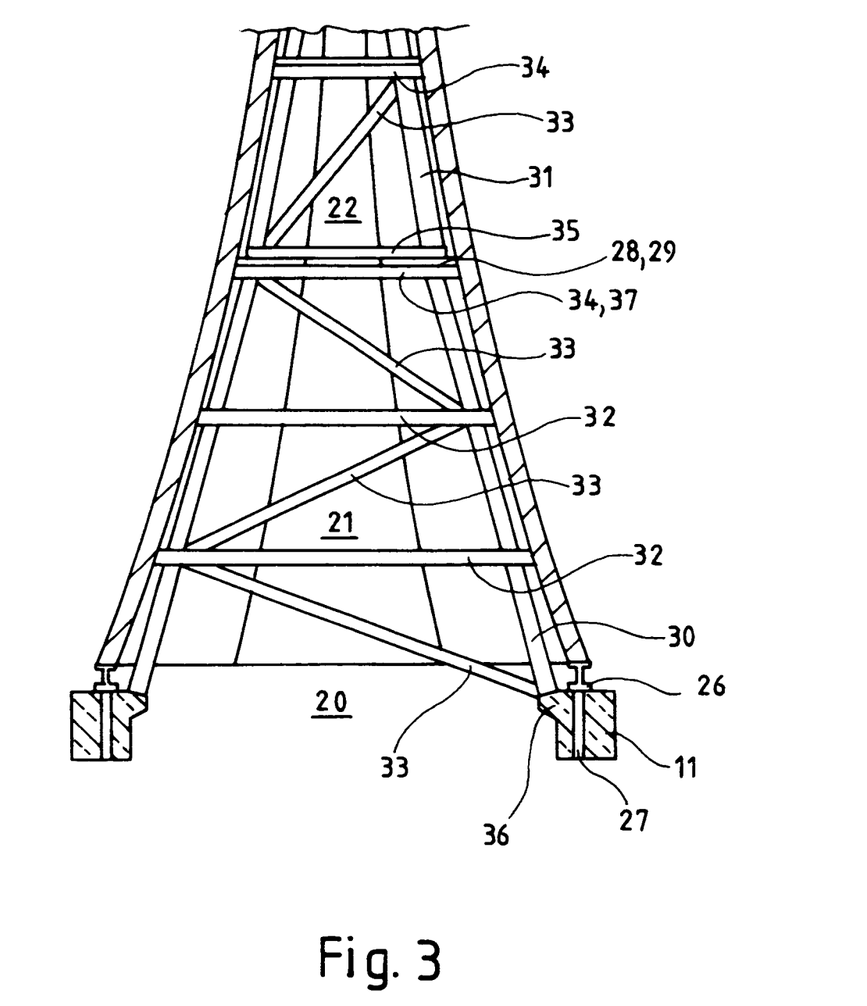
FIG. 3 shows a three-dimensional sectional view of the first embodiment of the tower according to the invention.

FIG. 1 shows a wind power plant 100 having a nacelle 110 and a rotor 120 with an illustrated rotor blade 130, and a tower 10. The tower 10 has a footing in the form of a foundation 11, a tower body 12 and a connecting piece 13 for receiving the nacelle 110. The clearance 140 in relation to the tower 10 is shown at a tip 131 of the rotor blade 130. Said clearance varies depending on the prevailing wind strength, which is to be taken into consideration during the design of the tower 10. FIG. 1 shows a surface line 150 which has a rising gradient as the height of the tower 10 increases. It can be a curve here, as is shown in FIG. 1 and FIG. 3, or it can consist of individual linear sections 151, 152, 153, as is shown in FIG. 2.

The footing 11 of the wooden tower 10 is brought about by a foundation 11, preferably a reinforced concrete foundation with a reinforced concrete base, particularly preferably as cast-in-place concrete. The geometry of the reinforced concrete base is adapted to the geometry of the wooden tower construction, the base preferably being configured here so as to be cast to form a polygonal hollow body. The converter and transformer system which is required for outputting electricity to the power grid is preferably accommodated, for example, in the hollow body as foundation base. The access to the system takes place through the foundation base 11 and thus makes a homogeneous design of the wooden tower 10 possible.

The main part of the tower 10 is formed by a tower section 12 which is assembled from individual wall sections 14 in the form of wooden panels which form a polygonal hollow body. Here, the individual wall sections 14 in the form of wooden panels are arranged in a helix structure A. In the present case, a double helix structure is shown with two helices A and B. Each individual wall section 14 consists of a panel made from a wooden composite material in the form of cross-laminated timber or solid wood elements which are adhesively bonded to one another. Dovetail connections or perforated plates (both not shown) come into consideration as connecting means in the case of the horizontal and vertical connections. Furthermore, threaded rods (not shown) which are inserted into gaps and are preferably adhesively bonded can also be used. The wall sections 14 have a trapezoidal shape.

In order to erect a hollow body as tower body by way of the joining together of the wooden panels in the helix structure A or double helix structure A, B, falsework 20 is erected as assembly aid and in order to produce the gradient of the surface line 150. The falsework 20 consists of sections, such as 21, 22, 23, and is preferably configured as a timber frame construction. A platform 24 which acts as stiffening level 25 in the wooden tower is arranged at the upper end of the timber frame. An I-beam 26, for example, is situated between the foundation base 11 and the wooden tower. The connection of the beam 26 to the foundation 11 takes place via threaded rods 27. The connection between wooden tower and I-beam as base formation is produced by prestressing threaded rods which are bonded in or by way of perforated plates. The connecting piece 13 between the wooden tower and the nacelle 110 of the wind power plant 100 is formed by a steel tube adapter in the form of a truncated cone. The tower 10 is given a textile surface (not shown) which is adhesively bonded over the full area, is applied to the panels in advance and, after the adjusting work has finished, encloses the full surface of the tower 10 in an overlapping manner.

An ascent to the top of the tower takes place via a ladder-guided elevator system or via a vertical ladder in combination with a fall arresting device. In the case of ladder lengths of more than 10 m, rest platforms are attached at intervals of at most 10 m. Intermediate platforms 24 which are positioned statically in order to stiffen the tower construction are situated, for example, every 3.75 m in the wooden tower.

Figure 4:
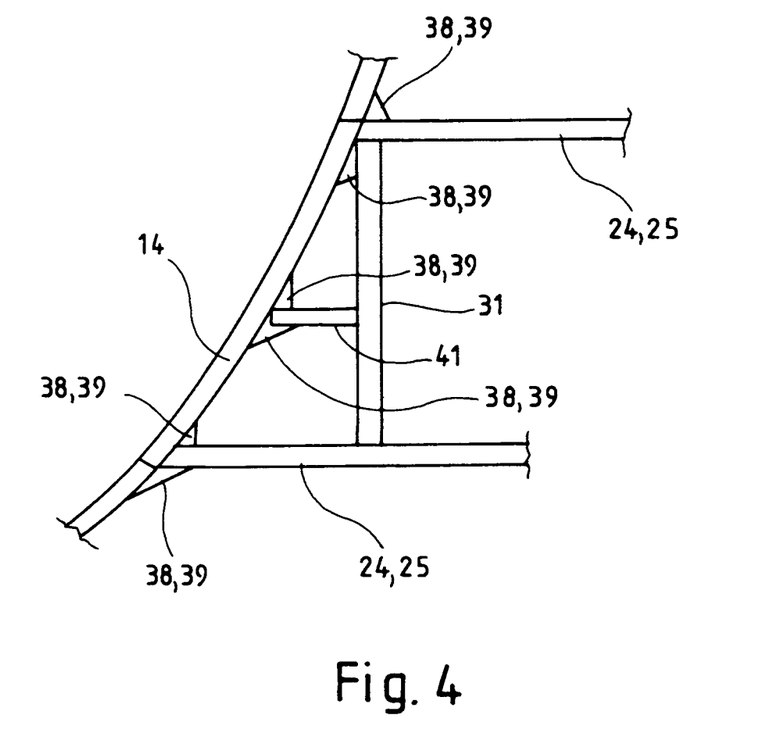
FIG. 4 shows a detailed view of a tower according to the invention.

The falsework 20, referring to FIGS. 3 and 4, serves as assembly aid to ensure the correct positional fixing of the individual wall sections 14 in the form of wooden panels, and to produce the curvature of the panels in a corresponding curve of the surface line 150. The falsework 20 includes individual stiffening levels 25 consisting of wooden panels 28, 29. The latter falsework panels rest, for example, on head blocks 34 or beams 37 of the falsework 20. Each individual stiffening level 25 of the falsework 20 is supported four times by the provision of stands 30, 31, in order to ensure the position of the stiffening level 25 and to dissipate the weight and the mounting loads of the tower wall sections 14 into the foundation 11 during the period where the wall sections 14 are mounted to Falswork 20 before that are assembled to each other. The stands 30, 31 are connected to one another as a timber frame (FIG. 3) by way of bars 32 and struts 33 and head and sole blocks 34, 35. The falsework itself consists of a first falsework section 21 which has base stands 30 which stand on a falsework foundation 36 which is a constituent part of the foundation 11 and is connected to the tower foundation. The base stands 30 are arranged diagonally, with the result that at their upper end, on which the head block 34 or a beam 37 is provided, on which the next falsework section is provided. For example, a cable shaft and a shaft for an elevator or a ladder system are provided in the stiffening level 25.

The edges of the stiffening level 25 are sealed by way of squared timbers 38 or molded beams 39 (FIG. 4). A stiffening connection between the stiffening level 25 and wall sections 14 of the tower 10 is also produced by way of said sections. The falsework 20 ends with an upper falsework section (not shown) which is smaller than the last tower wall sections 14, with the result that no connection is produced between the connecting piece 13 and the falsework 20 and the connecting piece 13 is supported wholly by the completed tower 10 composed of the interconnected wall sections 14.

Figure 5:
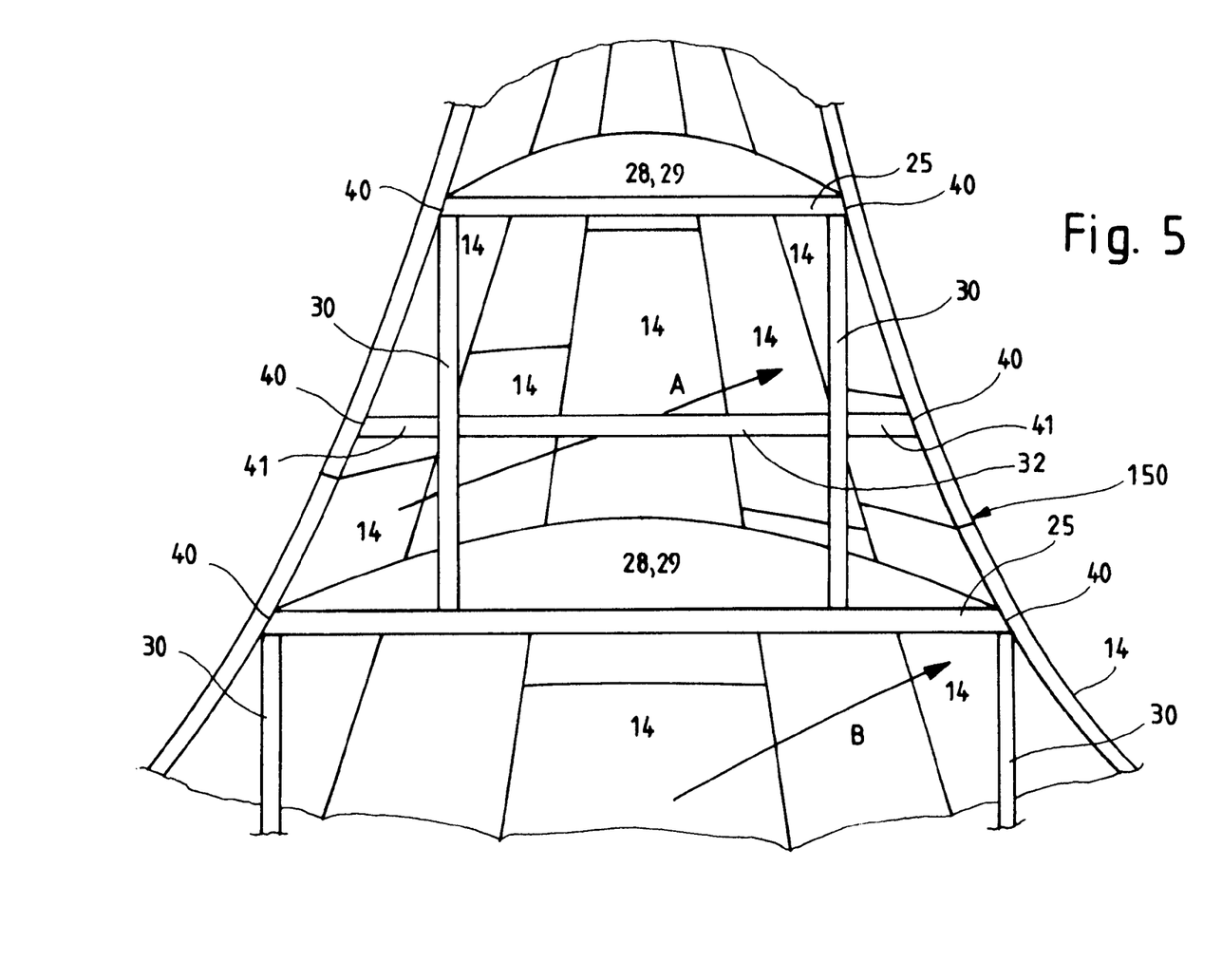
FIG. 5 shows a further detailed view of a tower according to the invention.

Fastening points 40, at which the falsework 20 is connected to the wall sections 14, are provided in the falsework. If the surface line is to be provided as a curve, in addition to the fastening points 40 on the stiffening levels 25, further fastening points 40 are provided on the bars 32 and/or on connecting elements which are attached to the stands 30, 31. In this way, the wall sections 14 can be deformed, with the result that they are provided convexly with respect to the center of the falsework 20, in relation to their end levels. The deformation is realized such that no damage of the wall sections 14 occurs (FIG. 5).

FIG. 2 shows a further embodiment of a tower 10 according to the invention. In said tower, individual steps are provided, onto which the wall sections 14 are mounted. In said embodiment, the wall sections are not provided as a helix A, B. The surface line sections 151, 152, 153 are of linear configuration and are fastened to the falsework. It is also possible in said embodiment, however, to provide a curve as surface line 150.

In order to erect the tower 10, the individual wall sections 14 in the form of wooden panels are driven to the assembly site. The falsework 20 is subsequently started, by the lowermost first section 21 of the falsework 20 being erected on the foundation 11. The lowermost wooden panels are connected by means of screw connection at the fastening points 40 to the first falsework section 21 and once properly positioned on the falsework 20, then connected to one another removing any weight bearing of the tower 10 wall from falsework 20. Wall sections 14 are interconnected using either perforated plates or dovetail connections. Afterward, the construction is raised onto the foundation base 11 which has been previously constructed. The base connection between the wooden tower and the foundation 11 takes place by means of adhesively bonded threaded rods 27 in the panels, into which threaded rods 27 are premounted and are connected to the individual I-beams 26 by way of nuts. After the lower tower segment is lowered, screwing to the foundation base takes place. The connections of the vertical joints of the wooden panels are formed before the next tower segment is constructed. The connection of the vertical joints takes place by solid wood wedges being bonded in. In the case of the connection by means of dovetail connections, a highly accurate fit of the panel arrangement in the horizontal joint is achieved when being joined together, as a result of the geometric arrangement during the joining of the panels. The incoming wooden panel is positioned at the upper end of the wooden panel below and is tightened positively by means of a screw connection. The position of the panels may be adjusted on falsework 20 before tightening the fasteners to the falsework 20 and prior to being assembled to each other. As an alternative, perforated plates are provided instead of dovetail connections for interconnection wall sections 14, or alternatively vertical joints with solid wood wedges bonded in. The positive and nonpositive interconnection in the region of the connection of the falsework 20 horizontal joints of the wooden panels takes place via threaded rods which are bonded in and are screwed to the metallic dovetail and prestressed. The transmission of the tensile forces between wood and wood or steel and wood can take place via perforated plate connectors, preferably steel plates. Thus as can be seen, successive segments of falsework 20 are erected, panels are positioned and then successively interconnected, such that the walls of tower 10 take on the load bearing while falsework 20 never bears the load of more than one segment's amount of wall sections 14. Thus falsework 20 never assumes any statically relevant load bearing of the tower 10 and the adapter 30.

The connecting piece 13 consists of a possibly conical steel element with a base flange for connection to the tower body 12 and a head flange for connection to the nacelle. Holes are provided in the head flange for plugging through threaded rods of the nacelle in order to produce a retentive connection. Either likewise holes or threaded rods are provided on the base flange.

Figure 6:
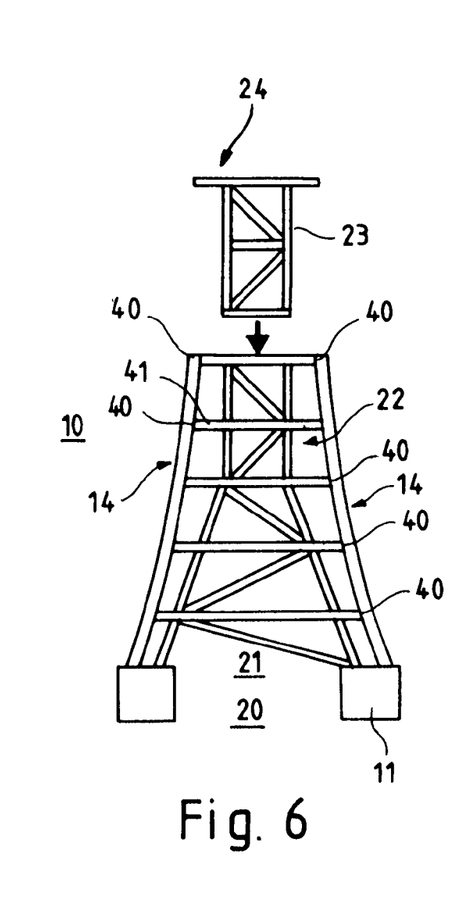
FIG. 6 shows a diagrammatic illustration of a first mounting step of a method according to the invention.
Figure 7:
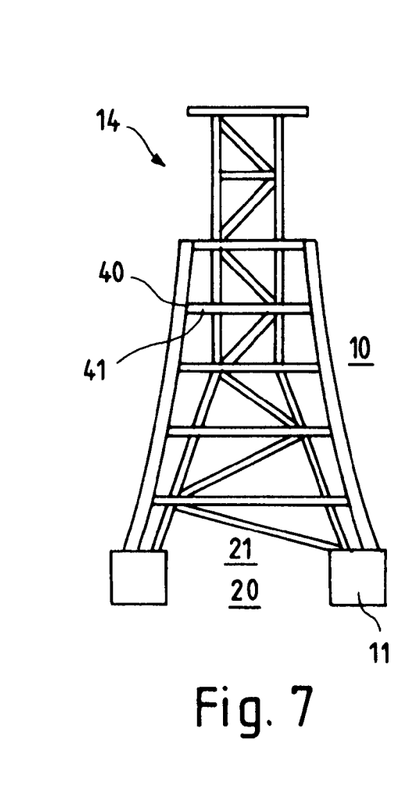
FIG. 7 shows a diagrammatic illustration of a second mounting step of a method according to the invention.
Figure 8:
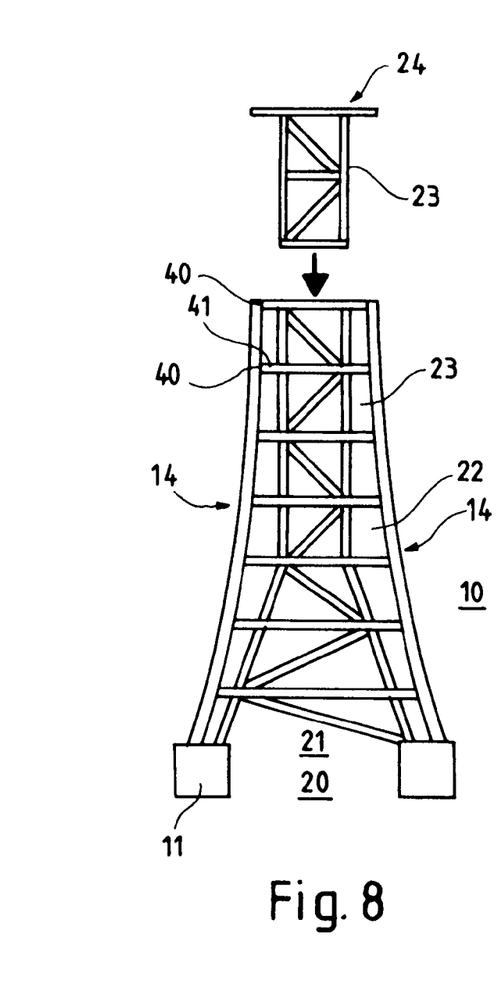
FIG. 8 shows a diagrammatic illustration of a third mounting step of a method according to the invention.

In order to mount the tower 10 (FIGS. 6 to 8), a lower falsework section 21 is erected on the foundation 11, to which lower falsework section 21 the first wall sections 14 are fastened, the latter being arranged in such a way that they stand on the foundation 11. The wall sections are connected via the fastening points 40 to the bars 32 and the stiffening levels 25 and the connecting elements 41, and are brought into the necessary shape via this, with the result that the desired surface line 150 is produced. Subsequently, the next falsework section 22 is deposited onto the stiffening level 25 and is connected to the section 21 which lies beneath it. The wall sections 14 are again mounted circumferentially, a retentive connection being produced to the previously mounted wall sections. The wall sections are connected via the fastening points 40 to the bars 32 and the stiffening levels 25 and the connecting elements 41, and are brought into the necessary shape via this, with the result that the desired surface line 150 is produced. Furthermore, the connection to the falsework sections serves for an improved mounting capability. After the final mounting of the wall sections 14, the next falsework section is mounted. Here, the premounting of the falsework sections 21, 22, 23 can take place on site. In the case of helical mounting, the falsework sections are smaller vertically than the individual wall sections 14, with the result that the mounting of the falsework sections can even take place in alternation with the respectively next one wall section.

LIST OF DESIGNATIONS

A First helix
B Second helix
10 Tower
11 Foundation/footing
12 Tower body
13 Connecting pieces
14 Wall section
20 Falsework
21 Section
22 Section
23 Section
24 Platform
25 Stiffening level
26 T-beam
27 Threaded rod
28 Wooden panel 29 Wooden panel
30 Stand
31 Stand
32 Bar
33 Strut
34 Head block
35 Sole block
36 Falsework foundation
37 Beam
38 Squared timber
39 Molded beam
40 Fastening point
41 Connecting element
100 Wind power plant
110 Nacelle
120 Rotor
130 Rotor blade
131 Tip
140 Clearance
150 Surface line
151 Linear surface line section
152 Linear surface line section
153 Linear surface line section

The invention claimed is:

1. A tower for a wind power plant comprising;
an outer wall comprising wall sections made from a wooden material, and;
an inner falsework, wherein
wall sections are fastened to the inner falsework for assembly, and the wall sections are inter-connected to each other as the tower wall is assembled, whereby as the wall is assembled, the entire load is borne by the outer wall and a surface line which is produced from a vertical section through the tower wall has a gradient which becomes greater as the tower height increases.

2. The tower as claimed in claim 1 comprising a polygonal base area wherein the vertical section is through the center of the tower.

3. The tower as claimed in claim 1 wherein the surface line is comprises at least one of a parabola, a polynomial, an exponential function, a circular arc or a clothoid.

4. The tower as claimed in claim 1 falsework is assembled from a plurality of sections comprising a platform, to which the wall sections are connected.

5. The tower as claimed in claim 4, wherein the falsework is a timber frame construction.

6. The tower as claimed in claim 4, wherein the timber frame construction has at least 4 stands which are connected by way of at least one of struts, bars, head blocks and sole blocks.

7. The tower as claimed in claim 1 wherein the wall sections are arranged offset with respect to one another to form a helix, the helix being at least one of a single helix or a multiple helix which is formed from a plurality of single helices.

8. The tower as claimed in claim 7, wherein the upper abutment sides of the individual constituent parts of the helix/helices have a continuous line or a step.

9. The tower as claimed in claim 1 wherein the wooden material is at least one of cross-laminated timber or wooden composite material, and the tower can be assembled from the individual wall sections on site.

10. The tower as claimed in claim 1 wherein the surface of the outer side of the tower comprises a coating, wherein the coating seals the outer side of the tower against environmental influences, including exterior moisture.

11. The tower as claimed in claim 10, wherein the coating contributes to bearing some of the outer wall load.

12. The tower as claimed in claim 10, wherein the coating is applied over at least a pert of the outer wall surface and is at least one of
a layer material,
a film,
a panel
a textile,
or individual sections which are connected to one another.

13. The tower as claimed in claim 10, wherein the coating is at least one of
adhesively bonded,
welded,
or applied directly to the wall sections of the tower.

14. The tower as claimed in claim 1 wherein the surface line rises linearly in sections.

15. A method for erecting a tower for a wind power plant comprising the following steps
mounting of a first part of an inner falsework on a foundation;
producing wall sections for an outer wall;
mounting a first group of wall sections on the foundation and connecting between the sections;
fastening the first wall sections to a lower part of the falsework;
building a next part of the falsework to the upper side of the preceding falsework part;
attaching a next group of wall sections to the sections which lie beneath them and between them and to the falsework;
interconnecting the wall sections as the wall is assembled; and,
repeating of the steps until the tower is completed, wherein;
the wall sections are arranged in such a way that a surface line gradient increases with the tower height and as the tower is assembled the interconnected wall sections bear their own load and when the tower is complete the entire tower load is borne by the wall outer wall and no load is borne by the false work.

* * * * *